Oct. 11, 1927.

J. S. SANTIAGO 1,645,456

DIRECTION INDICATOR FOR VEHICLES

Original Filed Oct. 16, 1925

INVENTOR.
Juan Sierra Santiago
BY
ATTORNEY

Patented Oct. 11, 1927.

1,645,456

UNITED STATES PATENT OFFICE.

JUAN SIERRA SANTIAGO, OF SAN JUAN, PORTO RICO.

DIRECTION INDICATOR FOR VEHICLES.

Application filed October 16, 1925, Serial No. 62,733. Renewed August 17, 1927.

This invention relates to direction indicators, and more particularly to indicators for use on motor vehicles to indicate whether the driver intends to continue in straight path, or turn to the right, or to the left.

One of the principal objects of the invention is to provide a simple device of this character to be mounted over the radiator cap, operated from near the steering wheel, and be positive in its action.

Another object consists of the novel construction and arrangement of parts, and further objects will appear as the following description is read in connection with the accompanying drawings, which forms a part of this application and in which:—

Figure 1:
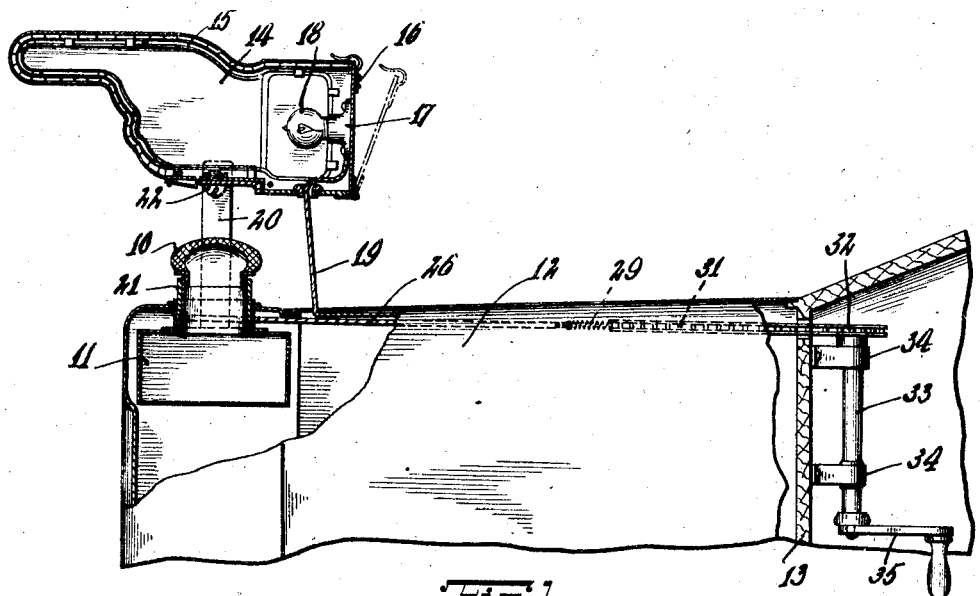
Fig. 1 shows a fragmentary, partly sectional side elevation of device attached to a vehicle.
Figure 2:
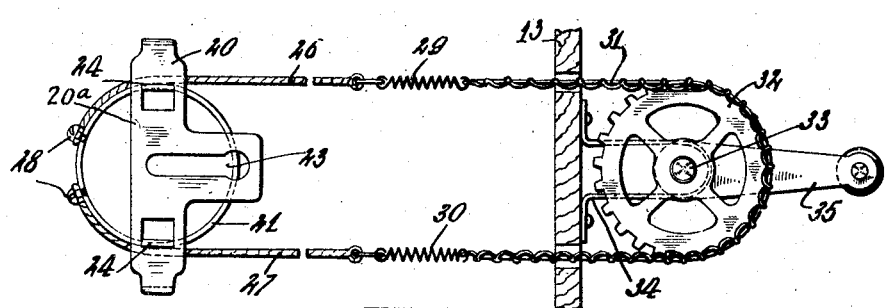
Fig. 2 shows an enlarged plan view of the device with the signal member removed.
Figure 3:
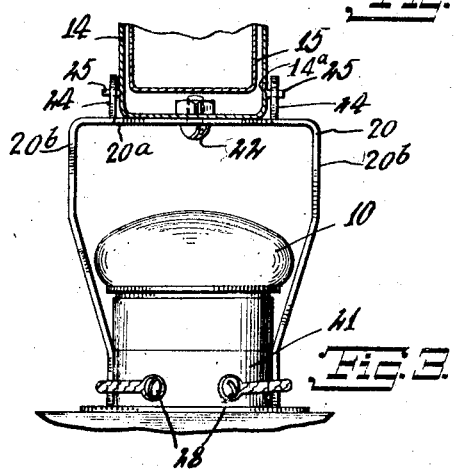
Fig. 3 shows a fragmentary, partly sectional side elevation of a radiator cap with the device attached.

The vehicle to which the device is attached has a radiator cap 10, an upper chamber of the radiator 11, an engine hood 12, and a dash board 13.

The signal member 14 is constructed similar to the signal members described in copending applications, with the addition of being provided with an inner lining 15 of red glass. As is usual in these signal members, there is a back cover 16 and an electric bulb socket 17 with an electric bulb 18 fastened thereto, and flexible leads 19.

The signal member 14 is supported by frame 20 consisting of T-shaped horizontal bar 20$^a$ containing a slot 23, and formed at each end thereof with arms 20$^b$, while struck from the bar 20$^a$ is a pair of lugs 24 containing rigidly secured pins 25. These lugs 25 are resilient so that the pins engage by spring action perforations 14$^a$ in the signal member 14 to prevent accidental turning of the said indicator. A bolt 22 engaging in slot 23, and engaging the signal member 14 permits an adjustment of the signal member. The terminal of the pair of arms 20$^b$ is securely secured to the attaching ring 21 movably mounted on the radiator cap.

Two flexible wires 26 and 27 are fastened to said movable ring 21 by screws 28. The other ends of said wires are provided with springs 29 and 30 for flexibility and elasticity, and thereafter to chain 31, engaged by sprocket wheel 32 on shaft 33 rotatably supported by bearing supports 34 fastened to the dash boards 13, and the end of said shaft is provided with a handle 35.

When the handle 35 is standing outright the signal member is pointing straight ahead, when handle is turned a quarter turn to the left signal member will turn a quarter turn to the right, likewise a turn to the right of handle causes a turn to the left of signal member. If wires 26 and 27 are crossed the operation of handle and signal member will be in similar direction.

Having thus described my invention, what I claim as new and desire to secure by Letters Patent of the United States is as follows:—

In a device of the class described, having a signal member formed with perforations, and an attaching ring movably mounted on a radiator cap, the combination of a T-shaped horizontal bar containing a slot for means for adjustably securing said signal member, arms depending from each end of said bar, the terminal of said arms being securable to said attaching ring, lugs struck from said bar, and pins rigidly secured in said lugs, said pins being engageable with said perforations.

In testimony whereof I have affixed my signature.

JUAN SIERRA SANTIAGO.